(12) United States Patent
Weider et al.

(10) Patent No.: US 11,526,701 B2
(45) Date of Patent: Dec. 13, 2022

(54) METHOD AND SYSTEM OF PERFORMING DATA IMBALANCE DETECTION AND CORRECTION IN TRAINING A MACHINE-LEARNING MODEL

(71) Applicant: MICROSOFT TECHNOLOGY LICENSING, LLC, Redmond, WA (US)

(72) Inventors: Christopher Lee Weider, Redmond, WA (US); Ruth Kikin-Gil, Bellevue, WA (US); Harsha Prasad Nori, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 707 days.

(21) Appl. No.: 16/424,412

(22) Filed: May 28, 2019

(65) Prior Publication Data
US 2020/0380310 A1 Dec. 3, 2020

(51) Int. Cl.
G06K 9/62 (2022.01)
G06N 20/00 (2019.01)

(52) U.S. Cl.
CPC ......... *G06K 9/6264* (2013.01); *G06K 9/6256* (2013.01); *G06K 9/6265* (2013.01); *G06N 20/00* (2019.01)

(58) Field of Classification Search
CPC .. G06K 9/6264; G06K 9/6256; G06K 9/6265; G06N 20/00
See application file for complete search history.

(56) References Cited

U.S. PATENT DOCUMENTS 5,862,325 A 1/1999 Reed et al.
7,318,051 B2 * 1/2008 Weston ................ G06K 9/6269
706/12

(Continued)

FOREIGN PATENT DOCUMENTS

EP 3483797 A1 5/2019
WO 02095534 A2 11/2002
WO 2020055580 A1 3/2020

OTHER PUBLICATIONS

Kamiran et al., "Data preprocessing techniques for classification without discrimination", In journal of Knowledge and Information Systems, vol. 33, Issue 1, Oct. 1, 2012, 33 Pages.

(Continued)

*Primary Examiner* — Manav Seth
(74) *Attorney, Agent, or Firm* — NovoTechIP International PLLC

(57) ABSTRACT

A method and system for performing semi or fully automatic data imbalance detection and correction in training a machine-learning (ML) model includes receiving a request to train the ML model, receiving access to a dataset for use in training the ML model, identifying a feature of the dataset for which data imbalance detection is to be performed, examining the dataset to determine a distribution of the feature across the dataset, determining if the distribution of the feature across the dataset indicates data imbalance, upon determining that the distribution of the feature across the dataset indicates data imbalance, identifying a desired distribution for the identified feature, selecting a subset of the dataset that corresponds with the selected feature and the desired distribution, and using the subset to train the ML model.

20 Claims, 11 Drawing Sheets

(56) References Cited

U.S. PATENT DOCUMENTS

| | | | | |
|---|---|---|---|---|
| 8,260,810 | B2* | 9/2012 | Hisanaga | G06T 7/33 |
| | | | | 707/769 |
| 8,412,651 | B2* | 4/2013 | Paiva | G06N 20/00 |
| | | | | 706/45 |
| 8,473,519 | B1* | 6/2013 | Siddiqui | G06F 16/00 |
| | | | | 707/791 |
| 9,838,407 | B1* | 12/2017 | Oprea | H04L 63/1416 |
| 9,916,540 | B2* | 3/2018 | Shoaib | G06N 20/10 |
| 9,984,219 | B2 | 5/2018 | Chaar et al. | |
| 10,354,205 | B1* | 7/2019 | Pham | G06N 20/00 |
| 10,401,275 | B2* | 9/2019 | Kavsek | G01N 33/49 |
| 10,546,232 | B2* | 1/2020 | Guo | G06V 40/167 |
| 10,861,028 | B2 | 12/2020 | Silberman et al. | |
| 10,990,901 | B2 | 4/2021 | Deo et al. | |
| 11,062,792 | B2 | 7/2021 | Grouchy et al. | |
| 11,256,959 | B2* | 2/2022 | Iyer | G06N 3/08 |
| 11,327,655 | B2* | 5/2022 | Kirkpatrick | G06F 16/1837 |
| 11,327,675 | B2* | 5/2022 | Swamy | G06F 3/0647 |
| 11,327,992 | B1* | 5/2022 | Batsakis | H04L 67/60 |
| 2013/0097103 | A1 | 4/2013 | Chari et al. | |
| 2015/0088791 | A1 | 3/2015 | Lin et al. | |
| 2017/0270429 | A1* | 9/2017 | Bhattacharya | G06N 20/10 |
| 2017/0330058 | A1 | 11/2017 | Silberman et al. | |
| 2019/0147371 | A1* | 5/2019 | Deo | G06N 20/20 |
| | | | | 706/12 |
| 2019/0228006 | A1 | 7/2019 | Tormasov et al. | |
| 2020/0081865 | A1 | 3/2020 | Farrar et al. | |
| 2020/0167653 | A1 | 5/2020 | Manjunath et al. | |
| 2020/0184423 | A1 | 6/2020 | Mcenroe et al. | |
| 2020/0226489 | A1 | 7/2020 | Li et al. | |
| 2020/0285898 | A1 | 9/2020 | Dong | |
| 2020/0302524 | A1 | 9/2020 | Kamkar et al. | |
| 2020/0380309 | A1* | 12/2020 | Weider | G06F 9/44 |
| 2020/0380398 | A1* | 12/2020 | Weider | G06F 16/285 |
| 2020/0380399 | A1* | 12/2020 | Weider | G06N 20/00 |

OTHER PUBLICATIONS

"International Search Report and Written Opinion Issued in PCT Application No. PCT/US20/028904", dated Aug. 4, 2020, 11 Pages.
"Fairness: Identifying Bias", Retrieved From: https://developers.google.com/machine-learning/crash-course/fairness/identifying-bias?, Apr. 18, 2019, 6 Pages.
"Notice of Allowance Issued in U.S. Appl. No. 16/424,253", dated Apr. 28, 2022, 16 Pages.
Wexler, et al., "Google AI Blog: Facets: An Open Source Visualization Tool for Machine Learning Training Data", Retrieved from: https://ai.googleblog.com/2017/07/facets-open-source-visualization-tool.html, Jul. 17, 2017, 6 Pages.
"Notice of Allowance Issued in U.S. Appl. No. 16/424,314", dated Apr. 28, 2022, 17 Pages.
Wachter, et al., "Counterfactual Explanations Without Opening The Black Box: Automated Decisions And The GDPR", In Journal of Harvard Law & Technology, vol. 31, No. 2, 2018, pp. 841-887.
"Pre-interview first office action Issued in U.S. Appl. No. 16/424,314", dated Sep. 9, 2021, 11 Pages.
"Final Office Action Issued in U.S. Appl. No. 16/424,371", dated Oct. 27, 2021, 25 Pages.
"First Action Interview Issued in U.S. Appl. No. 16/424,371", dated May 27, 2021, 5 Pages.
"Non Final Office Action Issued in U.S. Appl. No. 16/424,371", dated Apr. 20, 2022, 20 Pages.
"Preinterview First Office Action Issued in U.S. Appl. No. 16/424,371", dated Feb. 8, 2021, 5 Pages.
"Notice of Allowance Issued in U.S. Appl. No. 16/424,253", dated Mar. 17, 2022, 21 Pages.
"Pre-interview first office action Issued in U.S. Appl. No. 16/424,253", dated Sep. 2, 2021, 11 Pages.
"Notice of Allowance Issued in U.S. Appl. No. 16/424,314", dated Mar. 17, 2022, 23 Pages.

Adebayo, Juliusa., "FairML: ToolBox for Diagnosing Bias in Predictive Modeling", In the Dissertation Submitted to Massachusetts Institute of Technology, Department of Electrical Engineering and Computer Science, Jun. 2016, 99 Pages.
Zadrozny, Bianca, "Learning and Evaluating Classifiers under Sample Selection Bias", In Proceedings of the Twenty-First International Conference on Machine Learning, Jul. 4, 2004, 8 Pages.
Baldi, et al., "Bionformatics: The Machine learning Approach", In Journal of MIT Press, 1999, 23 Pages.
Batista, et al., "A Study of the Behavior of Several Methods for Balancing Machine Learning Training Data", In Journal of ACM SIGKDD Explorations, vol. 6, Issue 1, Jun. 1, 2004, pp. 20-29.
Buolamwini, et al., "Gender Shades: Intersectional Accuracy Disparities in Commercial Gender Classification", In Proceeding of Machine Learning Research vol. 81, Jan. 21, 2018, 15 Pages.
Wickham, Hadley, "Tidy Data", In Journal of Statistical Software, vol. 59, Issue 10, Aug. 2014, 23 Pages.
Cabrera, et al., "FAIRVIS: Visual Analytics for Discovering Intersectional Bias in Machine Learning", In Repository of arXiv:1904.05419v1, Apr. 10, 2019, 10 Pages.
Wirth, Niklaus, "Algorithms+Data Structures=Programs", In The Publication of Prentice-Hall, Inc., Oct. 22, 1985, 77 Pages.
Chung, et al., "Slice Finder: Automated Data Slicing for Model Interpretability", In Proceedings of SysML Conference, Jan. 2018, 3 Pages.
Crawford, Kate, "The Hidden Biases in Big Data", Retrieved from: https://hbr.org/2013/04/the-hidden-biases-in-big-data, Apr. 1, 2013, 4 Pages.
Dam, et al., "Agent Based Modelling of Socio-Technical Systems", In Publication of Springer Science & Business Media, 2013, 96 Pages.
Dreyfus, et al., "Mind Over Machine: The Power of Human Intuition and Expertise in the Era of the Computer", In Publication of the Free Press, 1986, 87 Pages.
Dreyfus, Hubertl., "What Computers Can't Do", In Publication of Harper & Row, 1972, 45 Pages.
Edelman, Shimon, "Computing the Mind: How the Mind Really Works", In The Publication of Oxford University Press, Sep. 8, 2008, 51 Pages.
Fernandez, et al., "Learning from Imbalanced Data Sets", In The Book of Springer International Publishing, 2018, 385 Pages.
Friedler, et al., "On the (im)possibility of Fairness", In Repository of arXiv:1609.07236v1, Sep. 23, 2016, pp. 1-16.
Goffman, Erving, "Frame Analysis: An Essay on the Organization of Experience", In The Publication of Harvard University Press, 1974, 55 Pages.
Grier, David A., "When Computers Were Human", In The Publication of Princeton University Press, 2005, 36 Pages.
Hayles, Katherine N., "My Mother Was a Computer: Digital Subjects and Literary Texts", In The Publication of University of Chicago Press, Mar. 15, 2010, 49 Pages.
Kleinberg, et al., "Inherent Trade-Offs in the Fair Determination of Risk Scores", In Proceedings of 8th Innovations in Theoretical Computer Science, Jan. 9, 2017, 23 Pages.
Kraska, Tim, "Northstar: An Interactive Data Science System", In Proceedings of the VLDB Endowment, vol. 11, No. 12, Aug. 1, 2018, pp. 2150-2164.
Kuhn, Thomas S., "The Structure of Scientific Revolutions", In Publication of The University of Chicago Press, Third Edition, 1996, 122 Pages.
Lakoff, et al., "Metaphors we Live by", In The Publication of University of Chicago press, Dec. 19, 2008, 66 Pages.
Li, et al., "REPAIR: Removing Representation Bias by Dataset Resampling", https://arxiv.org/abs/1904.07911, Apr. 16, 2019, 10 Pages.
Mindell, David A., "Our Robots, Ourselves: Robotics and the Myths of Autonomy", In The Publication of Viking Adult, 2015, 16 Pages.
"International Search Report and Written Opinion Issued in PCT Application No. PCT/US20/028385", dated Jul. 22, 2020, 9 Pages.
"International Search Report and Written Opinion Issued in PCT Application No. PCT/US20/028905", dated Jul. 24, 2020, 11 Pages.
"International Search Report and Written Opinion Issued in PCT Application No. PCT/US20/029034", dated Aug. 3, 2020, 12 Pages.

(56) References Cited

OTHER PUBLICATIONS

Schwartz, et al., "Practical Wisdom: The Right Way to Do the Right Things", In Publication of Penguin Group, 2010, 84 Pages.
Selbst, et al., "Fairness and Abstraction in Sociotechnical Systems", In Journal of Conference on Fairness, Accountability, and Transparency, Jan. 19, 2019, pp. 59-68.
Treffert, et al., "Islands of Genius", In Journal of Scientific American, vol. 286, Issue 6, 2010, 20 Pages.
"Notice of Allowance Issued in U.S. Appl. No. 16/424,253", dated Aug. 22, 2022, 11 Pages.
"Notice of Allowance Issued in U.S. Appl. No. 16/424,314", dated Aug. 24, 2022, 12 Pages.
"Final Office Action Issued in U.S. Appl. No. 16/424,371", dated Aug. 23, 2022, 27 Pages.
Webster, Merriam, "Definition of "Bayesian"", Retrieved from: https://web.archive.org/web/20181228121014/https://www.merriam-webster.com/dictionary/Bayesian, Dec. 28, 2018, 8 Pages.
Chouldechova, et al.,"The Frontiers of Fairness in Machine Learning", In repository of arXiv:1810.08810v1, Oct. 20, 2018, pp. 1-13.
Cortes, et al., "Sample Selection Bias Correction Theory", In proceedings of International Conference on Algorithmic Learning Theory, Oct. 13, 2008, 16 Pages.
Webster, Merriam, "Definintion of "Mitigate"", Retrieved from: https://web.archive.org/web/20190329114351/https://www.merriam-webster.com/dictionary/mitigate, Mar. 19, 2019, 12 Pages.
"Office Action Issued in European Patent Application No. 20725011.9", dated Aug. 18, 2022, 6 Pages.

\* cited by examiner

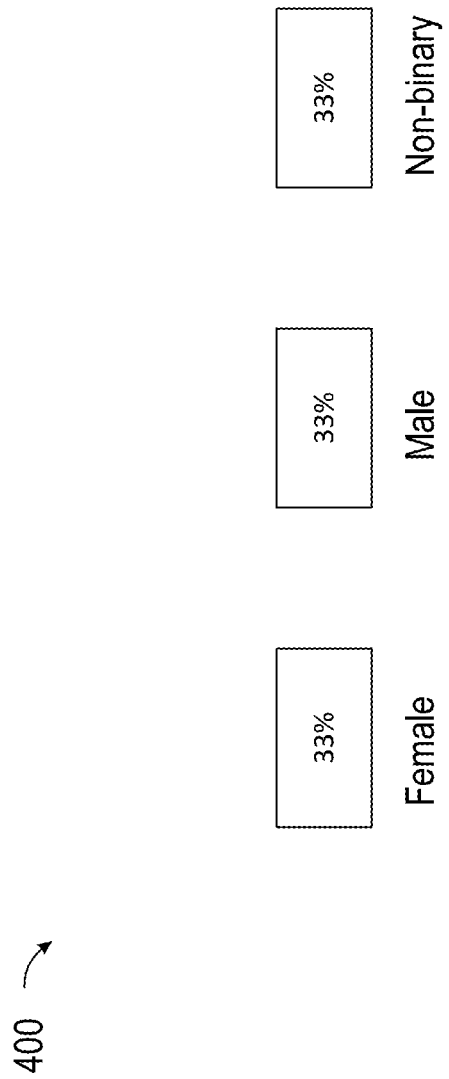

METHOD AND SYSTEM OF PERFORMING DATA IMBALANCE DETECTION AND CORRECTION IN TRAINING A MACHINE-LEARNING MODEL

CROSS-REFERENCE TO A RELATED APPLICATION

This patent application is related to co-pending, commonly-owned U.S. patent application Ser. No. (not yet assigned) entitled "Method and System of Detecting Data Imbalance in a Dataset Used in Machine-Learning," filed concurrently herewith under Attorney Docket No. 406443-US-NP/170101-328; U.S. patent application Ser. No. (not yet assigned) entitled "Method and System of Correcting Data Imbalance in a Dataset Used in Machine-Learning,"; and U.S. patent application Ser. No. (not yet assigned) entitled "Remote Validation of Machine-Learning Models for Data Imbalance,"; which are all incorporated herein by reference in their entirety.

BACKGROUND

In recent years, machine learning techniques are increasingly used in training machine learning models that provide functionalities in everyday life. These functionalities may have consumer related applications or may be used by institutions and organizations in automating decisions that were traditionally made by humans. For example, banks may use machine learning models to determine loan approvals, credit scoring or interest rates. Other institutions may utilize machine learning models to make hiring decisions, salary and bonus determinations and the like. Machine learning models may be used in making decisions in many other instances that have significant implications in people's lives. These machine learning models are often trained using large datasets that are collected in a variety of different manners by people or institutions. For example, researchers conducting research or organizations that are in the business of collecting data are some of the entities that may provide datasets for training machine leaning models.

The process of collecting data, however, often introduces bias in the dataset. For example, most datasets are skewed heavily towards a certain type of demographic. This may be because of bias in the way data is collected by the data collector or simply because data relating to certain demographics are more readily available. Regardless of how bias is introduced in a dataset, the results can be harmful. For example, if the dataset does not include as many female datapoints as male datapoints, the machine leaning model trained based on this dataset may produce results that are more favorable to males. When machine learning models are used to make important decisions, such biases can have significant implications for people.

Hence, there is a need for improved systems and methods of detecting and correcting bias associated with machine learning techniques.

SUMMARY

In one general aspect, this disclosure presents a device having a processor and a memory in communication with the processor wherein the memory stores executable instructions that, when executed by the processor, cause the device to perform multiple functions. The function may include receiving a request to train the ML model, receiving access to a dataset for use in training the ML model, identifying a feature of the dataset for which data imbalance detection is to be performed, examining the dataset to determine a distribution of the feature across the dataset, determining if the distribution of the feature across the dataset indicates data imbalance, upon determining that the distribution of the feature across the dataset indicates data imbalance, identifying a desired distribution for the identified feature, selecting a subset of the dataset that corresponds with the selected feature and the desired distribution, and using the subset to train the ML model.

In yet another general aspect, the instant application describes a method for performing semi or fully automatic data imbalance detection and correction in training a machine-learning (ML) model. The method may include receiving a request to train the ML model, receiving access to a dataset for use in training the ML model, identifying a feature of the dataset for which data imbalance detection is to be performed, examining the dataset to determine a distribution of the feature across the dataset, determining if the distribution of the feature across the dataset indicates data imbalance, upon determining that the distribution of the feature across the dataset indicates data imbalance, identifying a desired distribution for the identified feature, selecting a subset of the dataset that corresponds with the selected feature and the desired distribution, and using the subset to train the ML model.

In a further general aspect, the instant application describes a non-transitory computer readable medium on which are stored instructions that when executed cause a programmable device to receive a request to train the ML model, receiving access to a dataset for use in training the ML model, identify a feature of the dataset for which data imbalance detection is to be performed, examine the dataset to determine a distribution of the feature across the dataset, determine if the distribution of the feature across the dataset indicates data imbalance, upon determining that the distribution of the feature across the dataset indicates data imbalance, identify a desired distribution for the identified feature, select a subset of the dataset that corresponds with the selected feature and the desired distribution, and use the subset to train the ML model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 depicts an example bar chart displaying a distribution of data across the gender spectrum in a corrected subset of data.

DETAILED DESCRIPTION

Figure 1:
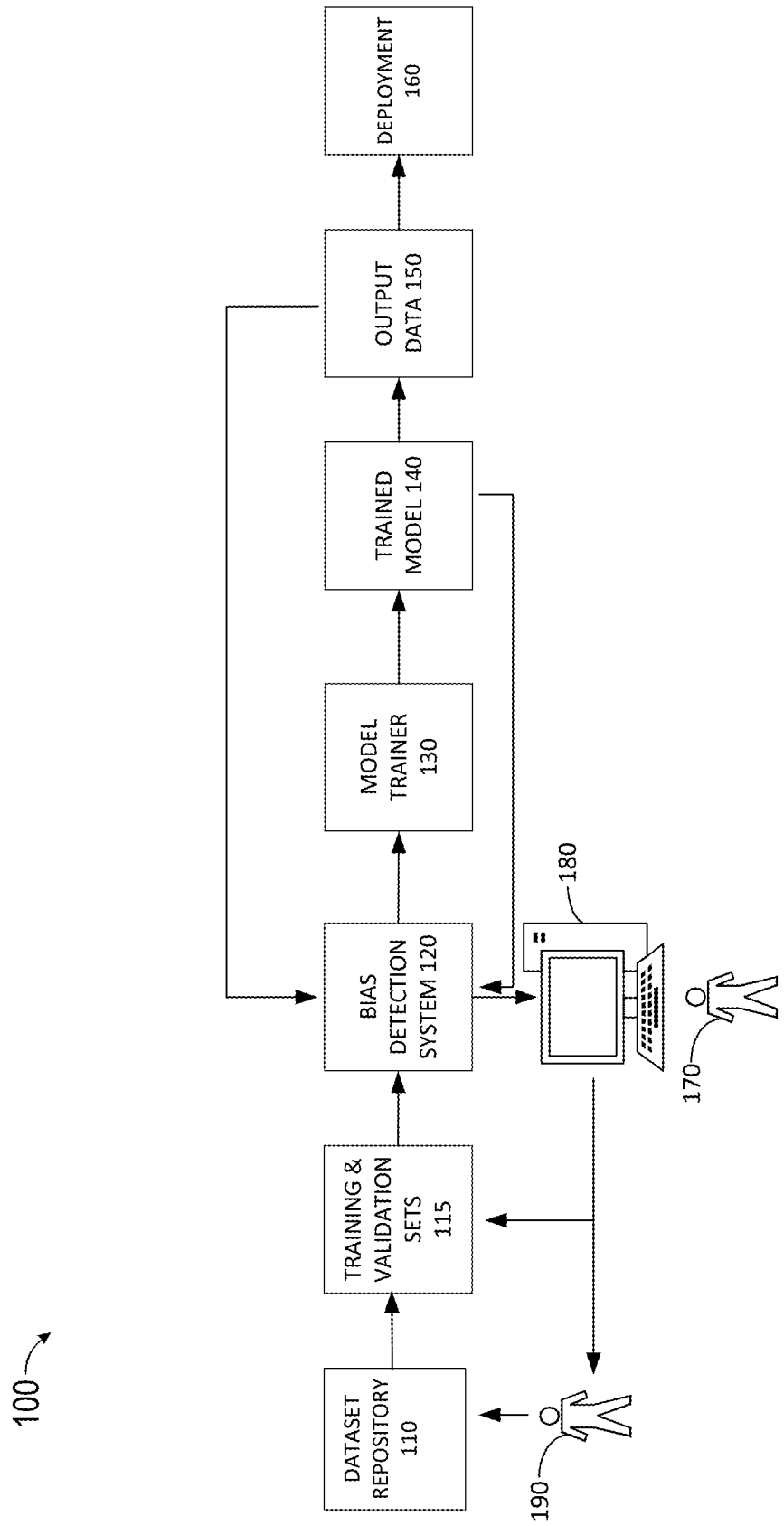
FIG. 1 depicts a simplified example system architecture for detecting and addressing data imbalance in machine learning operations.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Large datasets are increasingly used in training machine learning models that provide a variety of functionalities. With the significant increase in use of machine learning models in business and personal arenas to automate decision making functions, the contents of such large datasets can significantly affect different aspects of people's everyday lives. As a result, undetected and/or uncorrected bias in a dataset used for training a machine learning model can have significant negative implications on people or institutions the dataset was biased against. For example, if a dataset has a substantially larger number of datapoints for a particular population, the training performed based on such a dataset may heavily skew the trained model in favor of that particular population. This can introduce undesired and at times unknown discrimination against certain populations in the way the trained model makes decisions. Furthermore, a biased or imbalanced dataset may result in a model that produces incorrect results. For example, if a dataset has one or more features that have missing values for a large number of datapoints, it may be difficult to correlate those features with accurate outcomes. Thus, data imbalance may include biased data or data that otherwise contains some imbalance that may cause inaccuracies in outcome.

However, even after data imbalance is detected in a dataset, it may be difficult to correct it. That is because often data imbalance is introduced as a result of gaps in the dataset. In other words, data imbalance may be introduced when the dataset does not include enough datapoints for a certain demographic. To address this, more data associated with the certain demographic may need to be obtained to close the gaps. However, in many cases, additional data is too expensive and challenging to obtain. For example, human medical data used in training models related to the medical field may take years (e.g., longitudinal data on smoking risks) or be impossible to obtain. In another example, additional data cannot be obtained for correlating local pollution involving a toxic chemical with health risks, where the toxin is no longer being manufactured. In such cases, obtaining a new dataset or even additional datapoints intended to correct data imbalance in the dataset may not be an option. Furthermore, the process of obtaining a new dataset may introduce new unintended bias. Addressing such a data imbalance by obtaining more or new data may result in a continuous search for more data which can be inefficient and highly expensive. As a result, data imbalance in training a machine learning model may be difficult to correct.

The co-pending commonly-owned U.S. patent application Ser. No. (not yet assigned) entitled "Method and System of Detecting Bias in a Dataset Used in Machine-Learning,", and co-pending commonly-owned U.S. patent application Ser. No. (not yet assigned) entitled "Method and System of Correcting Bias in a Dataset Used in Machine-Learning,", both of which are incorporated herein by reference in their entirety discuss detecting and correcting data imbalance associated with machine leaning models.

The processes discussed in these patent applications, however, often involve substantial user action. Some machine learning training canvases (e.g., Azure ML) provide a construction canvas where operations such as data splitting, model construction, and output evaluation can be specified through dragging model training operations onto a free-form canvas and then running the process with the click of a button. However, these canvases do not typically provide a mechanism for human examination of intermediate results. As a result, to check for data imbalance in outcome of a machine leaning model, often the entire model needs to be constructed and tested. Afterward, if data imbalance is detected, then correction may need to be made before the entire process is repeated to determine if the correction functioned properly. This could take a significant amount of time, particularly since construction and training complex models can take days or weeks. However, as more and more machine leaning models are created, generating and deploying unbiased machine leaning models in a time and cost-efficient manner becomes more important.

To address these issues and more, in an example, this description provides techniques for providing semi or fully automatic data imbalance detection and/or correction in datasets associated with training of a machine learning model. In an example, checkpoints may be created and inserted into the model training process to allow a user to examine intermediate output at one or more stages of the process before the next step is executed. Depending on the outcome of the examination, the process may proceed or bias correction may be performed before moving to the next step. In one implementation, data imbalance detection and correction may be fully automated so that the end result is a model that meets a given output distribution within a given threshold. In a fully automated data imbalance detection and correction application, the process of detecting data imbalance, correcting data imbalance by trimming the input dataset and/or training and validation datasets, constructing the model, and examining the output for bias or inaccuracies may be done in an automated iterative fashion. As a result, the solution provides a method and system of easily and efficiently identifying and correcting data imbalance in large datasets associated with training of machine learning models.

As will be understood by persons of skill in the art upon reading this disclosure, benefits and advantages provided by such implementations can include, but are not limited to, a solution to the technical problems of inefficient, inaccurate and biased training of machine learning models. Technical solutions and implementations provided here optimize the process of detecting and correcting imbalance distribution of certain features of a database that may result in biased or inaccurate ML models quickly and efficiently by providing a semi or fully automated process. The benefits provided by these solutions include efficient and timely detection and correction of data imbalance in ML training which can increase accuracy and fairness and provide machine learning models that comply with ethical and legal standards.

As a general matter, the methods and systems described herein may relate to, or otherwise make use of, machine-trained models. Machine learning (ML) generally involves various algorithms that can automatically learn over time. The foundation of these algorithms is generally built on mathematics and statistics that can be employed to predict events, classify entities, diagnose problems, and model function approximations. As an example, a system can be trained in order to identify patterns in user activity, determine associations between various datapoints and make decisions based on the patterns and associations. Such determination may be made following the accumulation, review, and/or analysis of data from a large number of users over time, that may be configured to provide the ML algorithm (MLA) with an initial or ongoing training set.

In different implementations, a training system may be used that includes an initial ML model (which may be referred to as an "ML model trainer") configured to generate a subsequent trained ML model from training data obtained from a training data repository. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network.

Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

FIG. 1 illustrates system architecture 100 for detecting and correcting data imbalance in machine learning operations. The system 100 may include a dataset repository 110 which includes one or more datasets for training a ML model. Each dataset may include a significant number of datapoints. In an example the datasets may include tens of thousands of datapoints. The datasets may be provided by one or more organizations. For example, organizations that collect consumer data as part of their applications may provide data collected by the applications for training ML models. In another example, a dataset may be provided by a researcher conducting research on a population or scientific subject. For example, health related data may be provided by researches that conduct research in the medical field and provide their findings in a dataset. Other types of data collection may be employed. For example, polling data may be collected and provided by pollsters, or data relating to specific outcomes may be collected and provided by organizations that wish to use the outcomes to train models that predict more desirable outcomes. For example, banks may collect data on loan defaults and circumstances that lead to defaults to train a ML model that determines if a person qualifies for a loan. In another example, non-human data may be collected and provided by organizations that work in a field. For example, temperature readings from a large set of automated sensors may be collected in a dataset and used to train a ML model for predicting conditions that correspond with temperature changes. In one implementation, the training datasets may be continually updated as more data becomes available. It should be noted that the dataset can include tabular and non-tabular data. For example, datasets including image or voice data may be used to train facial recognition or voice recognition ML models. The dataset repository 110 may be stored in a cloud environment or one or more local computers or servers.

To comply with privacy and security regulations and ethical guidelines, the datasets may be anonymized and generalized to ensure they do not expose a person's private information. However, even if a dataset does include some private information, the bias detection and correction system 120 may only retain facets of the data that are anonymized and generalized such that there is no connection between the final results and any specific data point that contributed to it.

Once a dataset is ready to be used in training a ML model, the data included in the dataset may be divided into training and validation sets 115. That is because when a model is trained on a certain set of data, the data may be split into a training subset and a validation subset. This is to determine whether the model is accurately processing data it has not seen before. The process may involve training the model on the training subset of data, and then providing the trained model the validation subset of data as input to determine how accurately the model predicts and classifies the validation data. The predictions and classifications may then be compared to the labels already determined by the validation dataset to determine their accuracy.

Once the subsets have been prepared, the dataset 110 may be examined by a bias detection and correction system 120 to determine if any undesired bias exists in the dataset. The bias detection system 120 may be provided as a service that can access and statistically examine a dataset to identify bias. Furthermore, the bias detection and correction system 120 may be provided as a tool integrated into one or more applications that process data. The bias detection and correction system 120 may be accessible via a computer client device 180 by enabling a user 170 to provide input, execute a data imbalance detection operation, view the results of the data imbalance detection operation via one or more user interfaces, and execute one or more data imbalance correction operations. The user 170 may be a person(s) responsible for managing the ML training.

The bias detection and correction system 120 may be used to detect bias in the original dataset in addition to identifying bias in other subsets of data, such as the training and validation subsets 115 used to train a model. That is because while many automated techniques for splitting the data set into training and validation datasets make an attempt to provide a good distribution of data in both datasets, the techniques do not check for or ensure that no data imbalance is introduced during the splitting process. Checking for data imbalance before training is thus an important part of producing low-bias ML models, as bias in the training data may introduce outcome bias or outcome inaccuracy in the model, and bias in the validation data may miss or overemphasize bias in the outcomes.

In one implementation, a user 190 may be notified of data imbalance detected by the bias detection and correction system 120 via for example the user 170. The user 190 may represent a researcher or any other person or organization responsible for collecting data as part of a dataset used in the system 100. The notification may include information about the types of bias identified in the dataset to enable the user 190 to collect data that fills the gaps identified by the bias detection and correction system 120. For example, if the bias detection system determines that the dataset does not include enough data entries for people of color, user 190 may be notified of this imbalanced distribution such that they can begin collecting more data that represents people of color. Thus, the bias detection system 120 may operate as a feedback mechanism to help researchers and data collectors collect more inclusive data. The more inclusive data may then be added to the dataset which may once again be examined via the bias detection and correction 120 system to ensure a more balanced distribution has been achieved and/or some other bias was not introduced in the process.

However, as discussed above, it may often be too challenging and/or expensive to obtain addition data. In such cases, the bias detection and correction system 120 may be used to select a subset of the original data in a way that reduces or eliminates the detected bias. For example, the bias detection and correction system 120 may be used to iteratively select a subset of the initial dataset (and/or subsets for training and validation) that reduce one or more of the identified biases (e.g., bias in the original dataset, bias in the split training and validation subsets of data, bias in labeling, and output bias) to under a given threshold or to match a given desired distribution.

Once a dataset in the dataset repository 110 is examined by the bias detection and correction system 120 and identified bias is corrected to a desired threshold, then the dataset may be used by a model trainer 130 to train a trained model 140. The model trainer 130 can be any supervised learning machine learning training mechanism known in the art and used for training ML models. After the training process is complete, then the trained model 140 may be used to generate output data 150, which may then be examined by the bias detection and correction system 120 to ensure the outcome does not show signs of bias or inaccuracy. That is because, even with unbiased input data, a model may be trained to deliver biases in outcome. For example, even if the input dataset includes an equal number of men and women, a trained model may rate more men than women good credit risks because of hidden associations in the data, because of a label imbalance (e.g., more men in the input dataset are labeled as good risks even though overall there are just as many good risks as bad risks in the input data), or because the validation dataset has a different distribution in key features than the training dataset. Thus, even if the input dataset is examined, corrected and approved as unbiased, it may be important to examine the outcome data to ensure that the outcome is also unbiased or low-biased. As a result, the output data 150 may be provided to the bias detection and correction system 120 to identify bias in the outcome. If and when undesired bias is identified in the output data 150, the bias detection and correction system 120 may be used to select a subset of the input data to correct the bias.

In one implementation, the bias detection and correction system may automatically determine what changes can be made to the input dataset to better train the model to address the identified bias and initiate correcting the bias by selecting a different subset of the data. Once the model is determined to be unbiased or low-biased within a threshold of desired distribution, then the trained model may be deployed for use in the real-world via deployment mechanism 160.

In one implementation, the entire process from examining the original input dataset, to examining the training and validation datasets, to making corrections to the datasets based on identified bias, to training the model based on corrected dataset(s), to executing the model to examine bias in outcome data, to performing corrections if needed, and to repeating the process as necessary may be done automatically without user input. Alternatively, checkpoints may be inserted at one or more stages in the process to allow a user to examine the results and make certain decisions regarding how to proceed. For example, a checkpoint may be inserted after each of the stages mentioned above.

Figure 2:
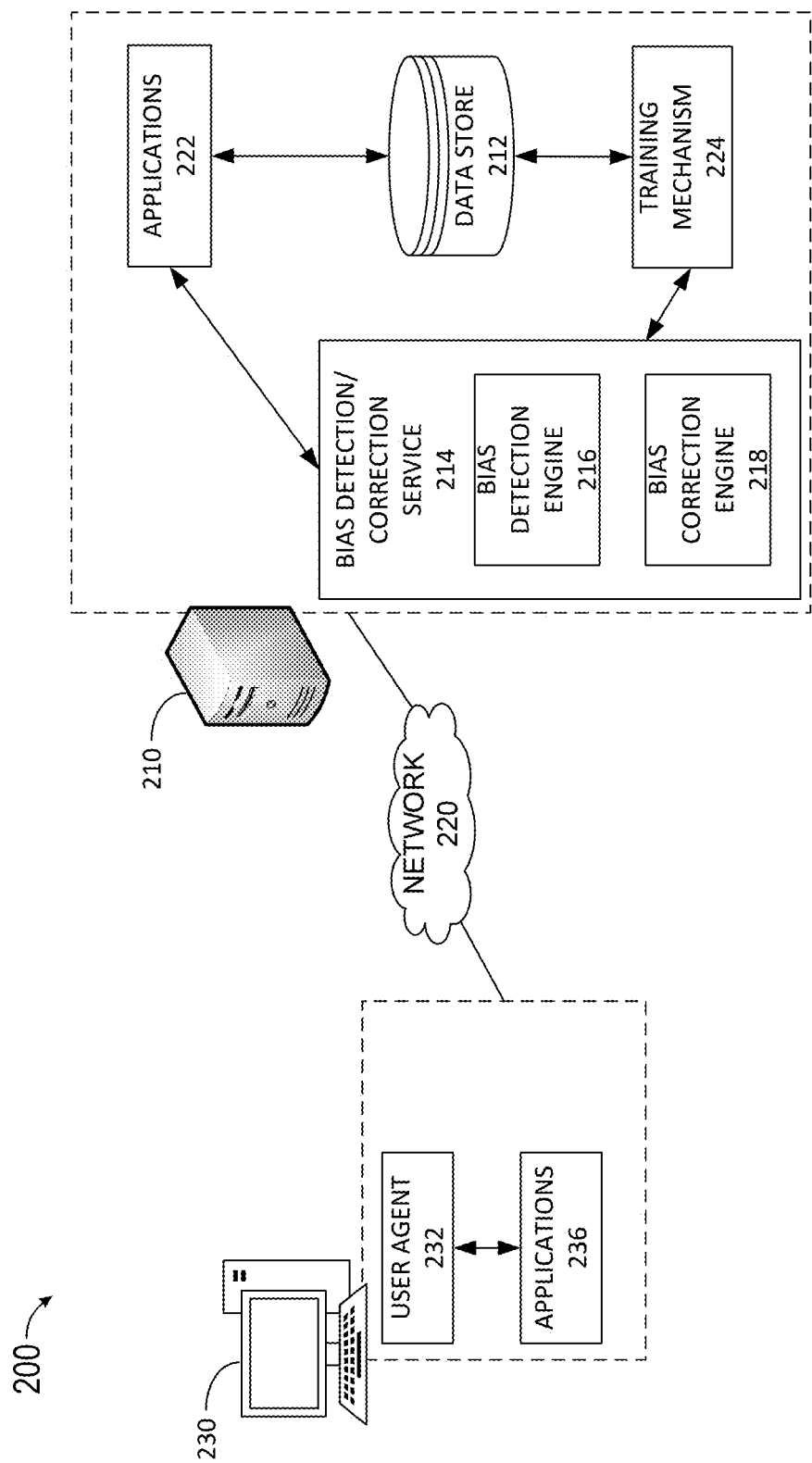
FIG. 2 depicts an example environment upon which aspects of this disclosure may be implemented.

FIG. 2 illustrates an example environment 200 upon which aspects of this disclosure may be implemented. The environment 200 may include a server 210 which may be connected to or include a data store 212 that may function as a repository in which datasets used for training ML models may be stored. The server 210 may operate as a shared resource server located at an enterprise accessible by various computer client devices such as client device 230. The server may also operate as a cloud-based server for bias detection and correction services in one or more applications such as applications 236.

The server 210 may also include and/or execute a bias detection and correction service 214 which may provide intelligent and automatic (e.g., semi or fully automatic) bias detection and correction. The bias detection and correction service 214 may operate to examine data processed or viewable by a user via an application (e.g., applications 222 or applications 236), identify bias in specific features of the data, report the detected bias to the user, and correct the detected bias. In one implementation, the process of detecting bias in a dataset is performed by a bias detection engine 216, while the process of correcting bias is performed via a bias correction engine 218. In one implementation, the bias detection engine 216 and bias correction engine 218 may be combined into one logical unit.

Datasets for which bias is examined, detected, and corrected by the bias detection and correction service may be used for training ML models by a training mechanism 224. The training mechanism 224 may use training datasets stored in the datastore 212 to provide initial and/or ongoing training for ML models. In one implementation, the training mechanism 224 may use labeled training data from the data store 212 train the ML models. The initial training may be performed in an offline or online stage. In another example, the training mechanism 224 may utilize unlabeled training data from the datastore 212 to train the ML model via an unsupervised learning mechanism. Unsupervised learning may allow the ML model to create and/or output its own labels. In an example, an unsupervised learning mechanism may apply reinforcement learning to maximize a given value function or achieve a desired goal.

The client device 230 may be connected to the server 210 via a network 220. The network 220 may be a wired or wireless network(s) or a combination of wired and wireless networks that connect one or more elements of the environment 200. The client device 230 may be a personal or handheld computing device having or being connected to input/output elements that enable a user to interact with various applications (e.g., applications 222 or applications 236) and services. Examples of suitable client devices 230 include but are not limited to personal computers, desktop computers, laptop computers, mobile telephones; smart phones; tablets; phablets; smart watches; wearable computers; gaming devices/computers; televisions; and the like. The internal hardware structure of a client device is discussed in greater detail in regard to FIGS. 7 and 8. It should be noted that client device 230 is representative of one example client device for simplicity. Many more client devices may exist in real-world environments.

The client device 230 may include one or more applications 236. Each application 236 may be a computer program executed on the client device that configures the device to be responsive to user input to allow a user to interact with a ML training mechanism. Bias detection and/or correction may be integrated into any of the applications 236 as a tool, for example via an application programming interface (API), that can be provided via the applications 236.

In some examples, applications used for allowing a user to interact with a ML training mechanism may be executed on the server 210 and be provided via an online service. In one implementation, web applications may communicate via the network 220 with a user agent 232, such as a browser, executing on the client device 230. The user agent 232 may provide a user interface that allows the user to interact with applications 222 and may enable applications 222 to provide bias detection and correction as part of the service. Applications 236 may have access to or display datasets in the data store 212 via the network 220 for example for user review and data imbalance detection and correction. In another example, data stored on the client device 230 and used by applications 236 may be utilized by the training mechanism 224 to train a ML model. In either scenario, data imbalance detection and correction may be provided to examine a dataset, identify data imbalance, and/or correct it.

Figure 3A:
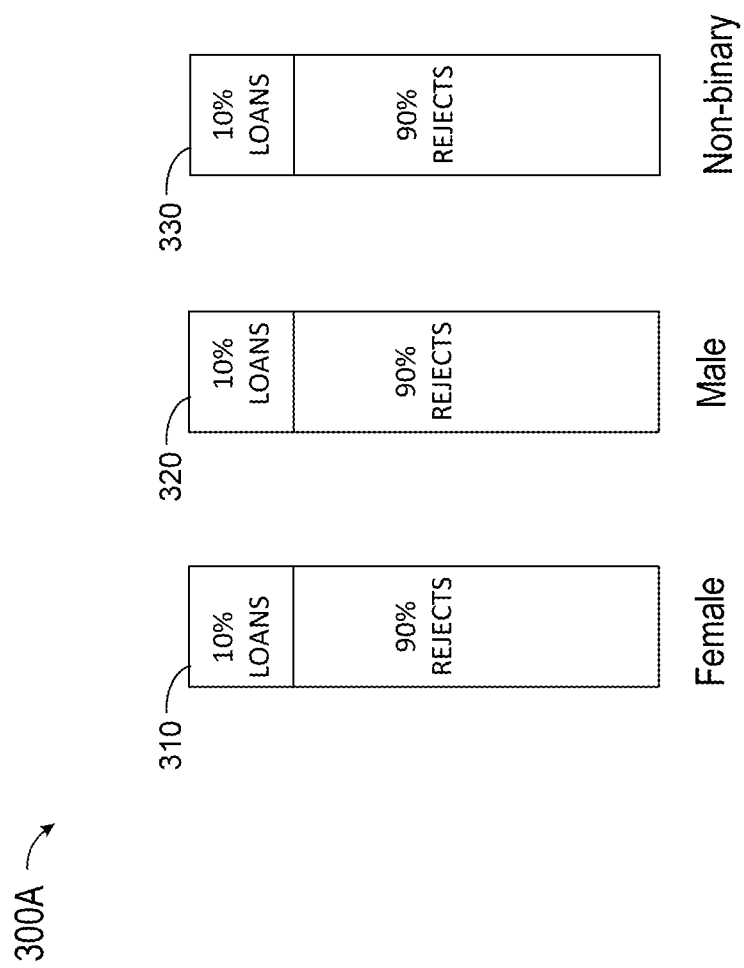
FIG. 3A-3C depict example bar charts for displaying distribution in data.
Figure 3B:
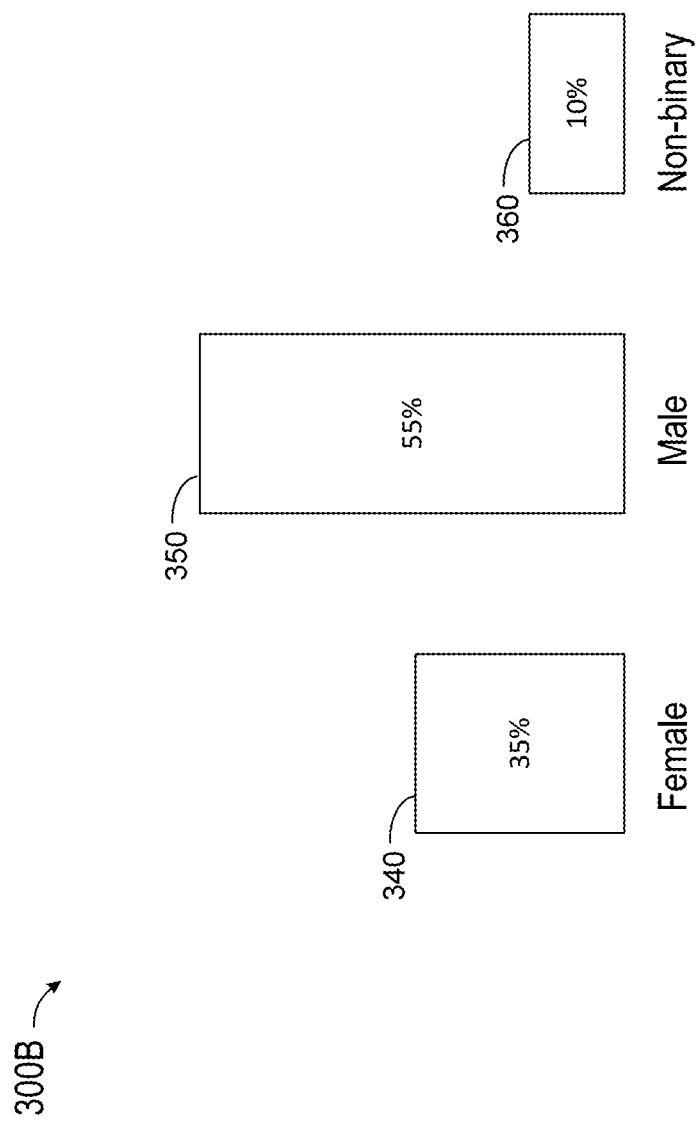

FIGS. 3A-3B depict example bar charts for displaying distribution in data to show how bias can be present in a dataset and affect outcome of a model. FIG. 3A displays a bar chart 300A that depicts an ideal distribution of data in a dataset based on a gender attribute of the dataset. This assumes that one of the attributes of a datapoint in the dataset is gender and gender is categorized by three categories: female, male and non-binary. The example also assumes that the dataset is used to train a model for determining loan approvals. For such a dataset, an ideal distribution based on gender may result in a female bar 310 that has an equal distribution to the male bar 320 and the non-binary bar 330. This means the number of datapoints that represent each of the categories of the gender attribute may be equal or be within a predetermined distribution threshold. As a result, the percentage of loans approved for people falling into each category may also be equal. Thus, the model trained by this dataset may generate outcomes that are consistent across the gender spectrum (e.g. 10% of loans submitted by applicants in each category are approved).

Figure 3C:
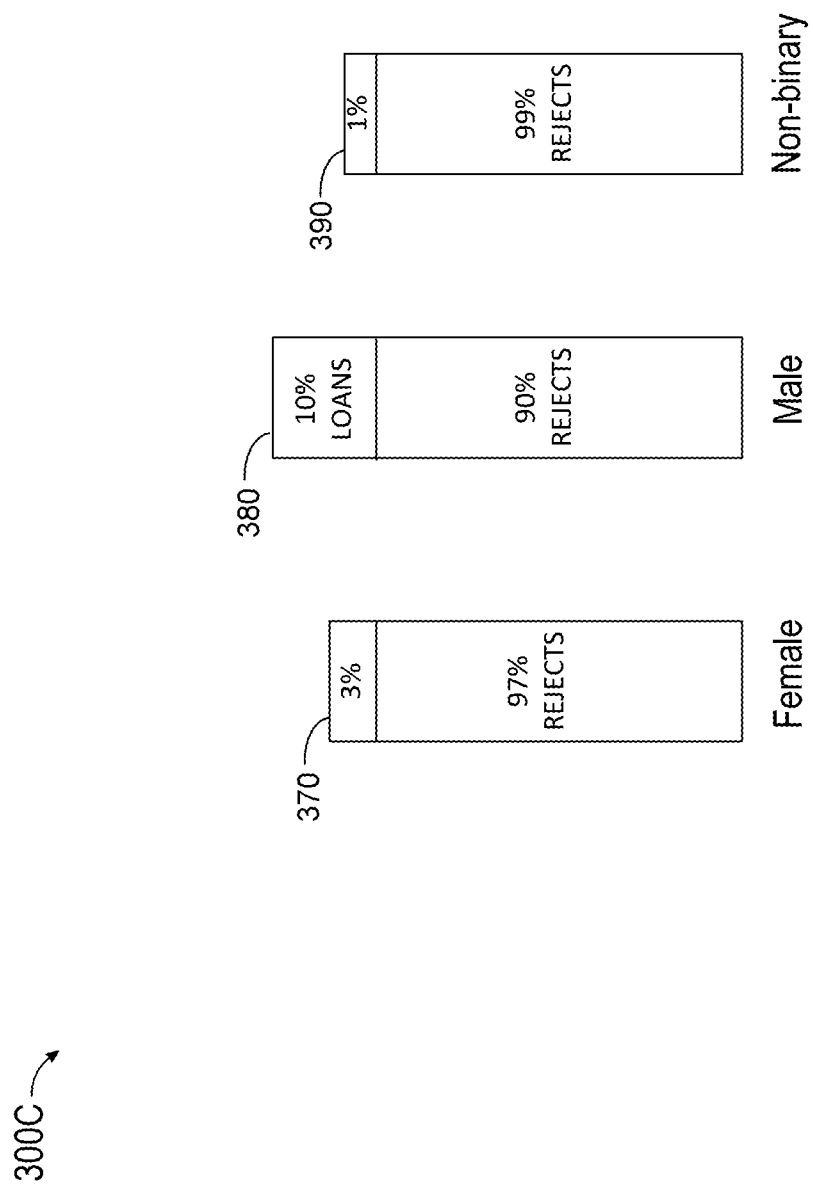

The ideal distribution depicted in FIG. 3A, however, rarely occurs in the real world. Often the dataset is representative of one category more than others. FIG. 3B depicts a bar chart 300B displaying a more realistic real-world distribution of data across the gender spectrum in a dataset. The bar chart 300B shows the female bar 340 represents 35% of the data, while the male bar 350 represents 55% of the data and the non-binary bar chart 360 represents only 10% of data. This shows a clear imbalanced distribution of data across the three categories. When such an imbalanced dataset is used to train a ML mode, the outcome is often severely biased. FIG. 3C depicts a bar chart 300C displaying such an outcome. The female bar 370 of bar chart 300C shows that the ML model rejects 97% of female applicants, while the male bar 380 displays how only 3% of the male applicants are rejected by the ML model. As the non-binary bar 390 shows, the percentage of people falling into the non-binary category that are rejected is even higher than the female applicants, with a 99% rejection rate. As such, imbalanced or biased distribution of input data in a dataset can significantly impact the outcome produced by a ML model trained with the imbalanced dataset.

To address such imbalanced distributions, the input dataset may be trimmed to select a subset of the dataset that represents a more balanced distribution. For example, the subset may be selected based on the size of the category having the smallest distribution. Referring to the imbalanced distribution of FIG. 3B, this may mean choosing the size of the non-binary category as the measuring point and selecting a dataset that corresponds with data in each of the female and male categories in numbers that are equal to or within a desired distribution of the non-binary category. For example, if the non-binary category includes 1000 datapoints from a total of 10,000 datapoints for the entire dataset, a subset may be selected such that each of the female, male and non-binary categories has 1000 datapoints. This is illustrated in FIG. 4 which depicts a bar chart 400 displaying a distribution of data across the gender spectrum in a corrected subset of data. As shown in FIG. 4, because of trimming of the dataset, the resulting subset shows a balanced distribution of data across the three categories of the spectrum. As a result, each of the categories of the corrected subset has about 33% of the data. In one implementation, after a correction is performed, the bias detection tool may be executed again to ensure that the new subset achieves its purposes and it does not generate new undesired imbalance in data. The process may automatically be repeated iteratively until the system determines that an acceptable corrected dataset has been achieved.

In a semi-automatic implementation where a checkpoint has been inserted after the bias detection system identifies a data imbalance in a feature of the dataset, the results may be reported to a user via one or more mechanisms (e.g., reports or charts) at that stage. Once the results are reported to the user, the user may be able to choose how to address any detected imbalance. For example, the user may choose to trim the original input dataset to reduce the data imbalance in the data by selecting a subset of the original dataset. Alternatively, the selection of a corrected subset of the original dataset may be performed by an automatic mechanism, as discussed further below.

Figure 5A:
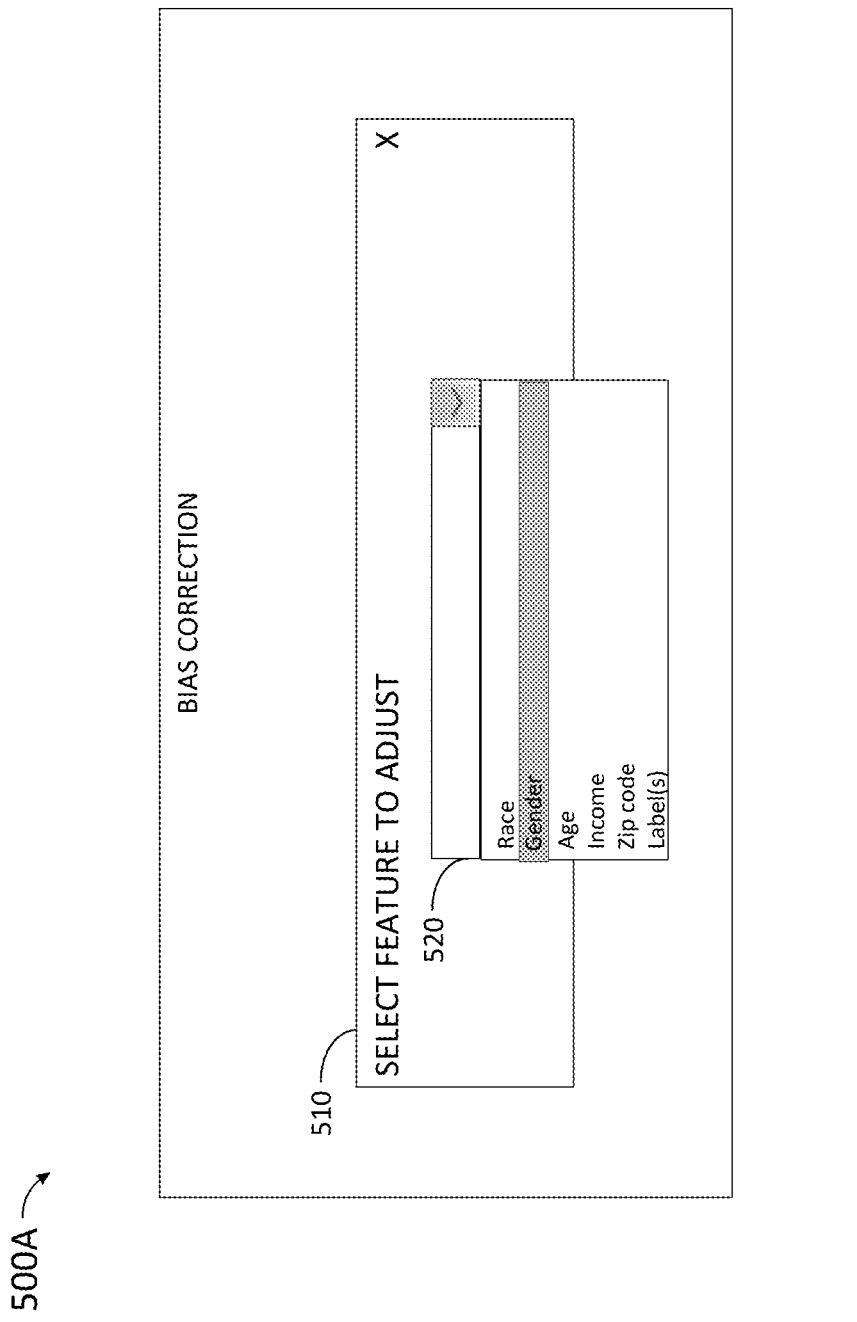
FIGS. 5A-5B depict more example methods of visualizing bias in a dataset.
Figure 5B:
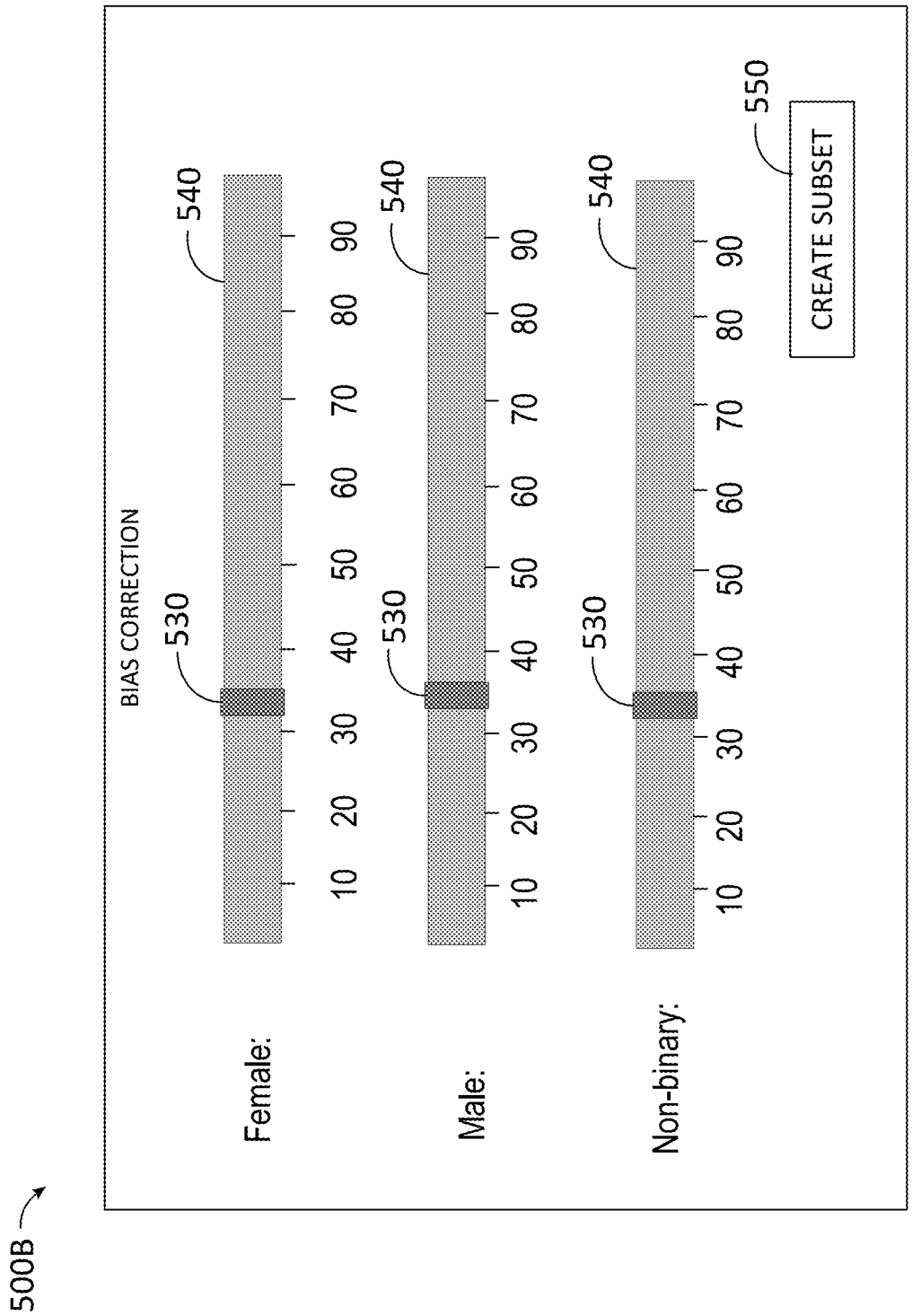

FIGS. 5A-5B depict example user interfaces for enabling the user to select a subset of the dataset to correct one or more detected imbalances in distribution. In an example, the user may have the option of initiating bias correction by selecting a menu option on a user interface of an application associated with training of ML models. Upon receiving the selection, the application or service may display a user interface such as user interface 500A of FIG. 5A to enable the user to choose a feature based on which the dataset can be trimmed. The user interface 500A may include a pop-menu 510 which may be displayed once the application receives a request to perform a semi-automatic bias correction. The pop-menu 510 may include a dropdown menu 520 for displaying a list of all features in the input dataset. For example, the dropdown menu 520 may display the features race, gender, age, income, and zip code for a dataset in which the data includes each of those features.

Additionally, the dropdown menu 520 may include an option for selecting label(s) for instances in which bias and/or data imbalance is introduced in labeling. That is because bias can easily be introduced in ML training via an imbalanced label. In general, in order for ML models to classify or predict binary or multi-class information, such as whether a face is male or female, or whether a given person is a good credit risk for an unsecured loan, the training data may include a label that specifies which class a given record falls into. This data may then be used to teach the ML model which category to apply to new input. In other words, the label data may teach the ML model which label to apply to new input. Thus, an imbalanced label may result in an inaccurate or biased ML model. For example, for an ML model designed to distinguish cats from dogs in pictures, having two few datapoints that are labeled as cats in the training dataset may result in the trained model not being able to accurately classify cats. Thus, label may be presented as one of the options available for which bias may be corrected.

The user may then select one of the presented options (e.g., gender) from the dropdown menu 520 to select a subset. In another example, two or more features may be selected from the dropdown menu 520. It should be noted that the pop-menu 510 and dropdown menu 520 are merely example user interface elements that can be used to enable the user to select a feature. Many other user interface elements or other mechanism may be used to achieve this purpose.

Once the user selects a feature (e.g., gender) from the dropdown menu 520, a second user interface such as user interface 500B of FIG. 5B may be displayed to enable the user to select a desired distribution for the feature. The user interface 500B may display a list of possible categories for the selected feature (e.g., female, male, non-binary) and present a percentage bar 540 having a slidable bar 530 for each of the categories. The percentage bars 540 may include markers that display percentages associated with each category. By moving the slidable bar 530 on each of the percentage bars 540, the user may be able to select the percentage of data points that fall into each category in the subset of the data. For example, to ensure a balanced distribution, the user may move the slidable bar 530 to select 33% of each of the three female, male and non-binary categories. Once the selections are made, a create subset menu button 550 may be pressed to enable creation of a subset of the dataset to correct data imbalance. After the subset is created, the user may be able to perform another bias detection operation on the newly created subset to determine if the new subset reduces or eliminates bias as desired and to ensure the new subset does not create new bias and/or data imbalance. Alternatively, the system may automatically perform the next iteration of bias detection. It should be noted that the percentage bars 540 and slidable bars 530 are merely example user interface elements. Many other user interface elements and controls may be used to enable the user to select the desired percentages.

In one implementation, the user may be provided an option to select another feature for which a distribution change may be needed. For example, after choosing the percentages for each categories of gender in user interface 500B and pressing on create subset button 550, the user may be presented with a pop-menu or another user interface element that asks the user whether he/she desires to select another feature to correct. Once the user communicates a positive response, the user may be presented the user interface 500A again to select another feature. In an alternative implementation, the user may initially select more than one feature from the dropdown menu 520 upon which successive user interfaces such as user interface 500B may be displayed to enable to user to select the desired distributions for each feature. In one implementation, only parts of the process may be performed by the user. For example, the user may select a feature and the corresponding desired distribution may be determined automatically by the system, or vice versa.

In one implementation, choosing desired distributions for more than one feature may not be possible as the percentages selected for each feature may create a conflict. For example, if the user chooses to have a subset of data that includes 33% female data points and 25% African Americans, those requirements may be in conflict with one another. In other words, it may be impossible to have both 33% female datapoints and 25% African American datapoints. In such situations, the user may be notified of the conflict and asked to adjust the percentages until a possible combination can be achieved. Alternatively, the bias detection and correction system may automatically choose the closest possible combination to the requested combination.

In one implementation, in addition to specifying the feature and the percentages, the user may also be able to choose the type of dataset from which the subset should be selected. For example, the user may be presented with an option to select the original input dataset, the training dataset, the validation dataset or the outcome dataset. In another example, the bias detection and correction system may automatically choose which dataset to select the subset from. For example, the bias detection and correction system may have a default of selecting the original dataset, unless specified otherwise. Alternatively, the bias detection and correction system may intelligently choose the dataset which may have the highest chances of positively affecting the trained model to eliminate or reduce bias.

Once the feature, percentages, and dataset are all selected, the bias detection and correction system may determine how to select a subset from the chosen dataset. For example, to select a subset based on the requirements of user interface 500B, the system may calculate the number of datapoints required from each of the categories to create a subset that corresponds with 33% female, 33% male and 33% non-binary. Once the number of required datapoints for each category is calculated, the system may randomly select data from the dataset that corresponds with the required numbers. In addition to random selection, other methods of selecting the datapoints that correspond with the required numbers are also contemplated.

Figure 6:
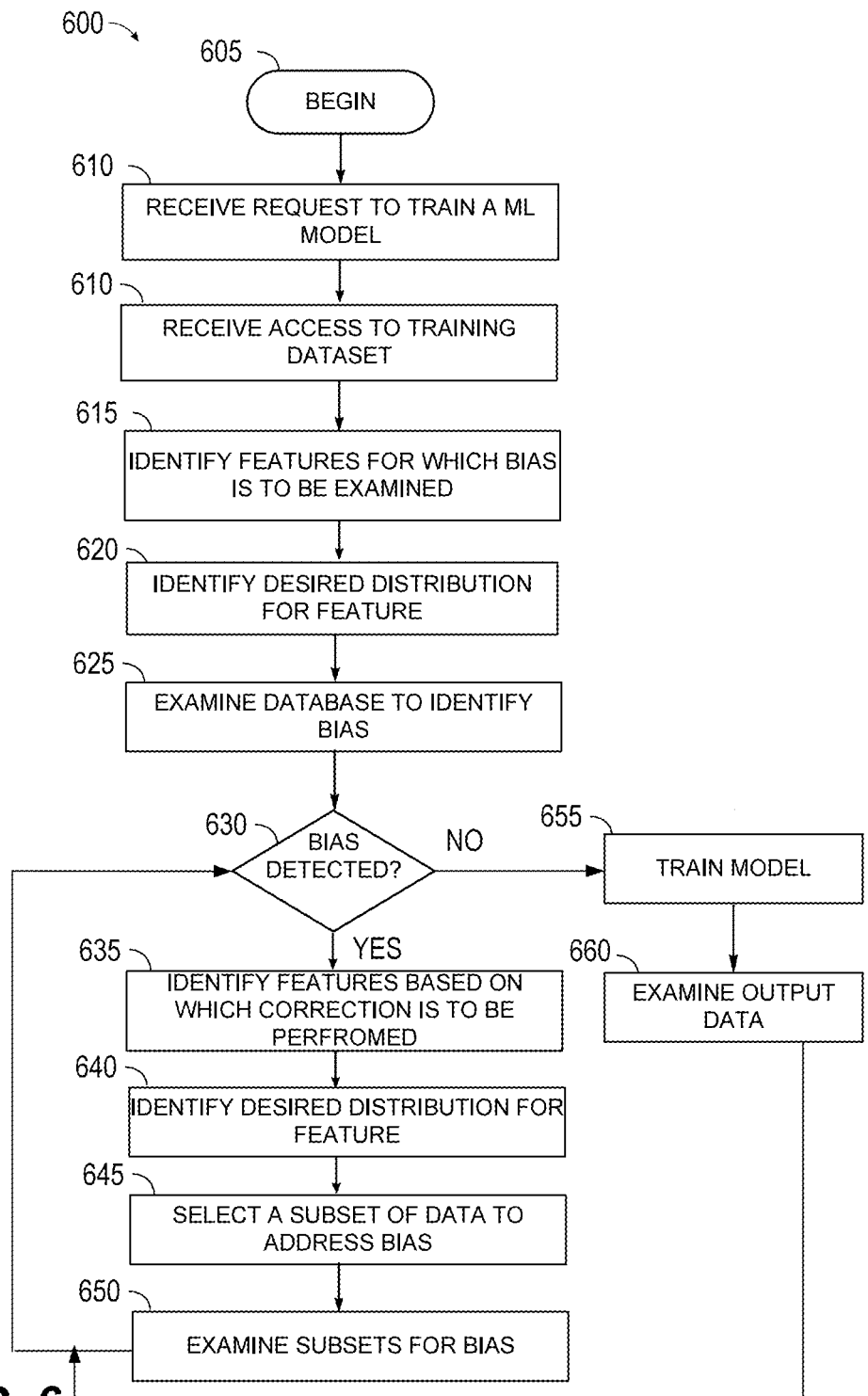
FIG. 6 is a flow diagram depicting an example method for providing data imbalance detection and correcting in a dataset associated with training a ML model.

FIG. 6 is a flow diagram depicting an exemplary method 600 for providing data imbalance detection and correction when training a ML model. The method 600 may begin, at 605, and proceed to receive a request to train a ML model, at 610. The request may be received via a user interface of an application or service that provides ML model training.

For example, it may be received via a menu button of a user interface associated with a ML model training service that provides bias detection and/or correction capabilities.

Once the request for performing data imbalance correction is received, method 600 may proceed to receive access to the training dataset, at 610. In one implementation, the request for training the model may include an indication identifying the dataset or subset(s) of the dataset to be used as input for training the ML model. For example, the request may identify a dataset stored locally or in a data store to which the ML model training service has access for performing ML model training operations. The bias detection and/or correction application may provide a user interface element for enabling the user to identify the datasets for performing ML model training. For example, a list of available datasets may be presented to the user as part of initiating the model training process. In one implementation, the user may be able to select the original input dataset or a subset of it. For example, the user may be able to select the training and validation subsets of data for a dataset for which a split in data has already been performed for model training. Alternatively, the dataset associated with the model for which training is being performed may be chosen automatically without user input. Once the dataset is selected, access to the dataset may be received.

After receiving access to the input dataset, method 600 may proceed to identify one or more features of the dataset for which data imbalance detection should be performed, at 615. In one implementation, the one or more features may be selected by a user. For example, this may be place where a checkpoint in the process is inserted to enable a user to provide input. In an example, the application or service may provide a user interface for choosing features of the dataset based on which bias correction may be performed. This may be presented as a list of options (based on available features of the dataset) for the user to choose from. Alternatively, the user may enter (e.g., by typing the name of the feature, or by clicking on a column heading of the dataset for a column displaying a desired feature, and the like) the desired feature(s) in a user interface element. In an example, the user may specify two or more features for which cross-correlation is desired. In addition to identifying the feature(s), the user may also specify a desired distribution for the selected feature(s), at 620. In one implementation, the user may also specify a desired threshold of similarity to the desired distribution for determining whether the data is biased. The desired distribution and/or the desired threshold may be the same or it may be different for each selected feature.

In a fully automated implementation, the features may be automatically and intelligently identified by the system. For example, method 600 may examine the dataset and determine if the dataset includes any features in a list of common features that are known to have ethical implications if the data distribution is not balanced. For example, the common features may include gender, race, sexual orientation, and age. In an example, the bias detection tool may examine the contents of the dataset and/or the type of ML model for which the dataset may be used to determine what feature(s) may be most appropriate for identifying bias and/or data imbalance. For example, race may be a more important feature to examine in a dataset that may be used to determine a ML learning used in crime detection to ensure the dataset is balanced and unbiased with respect to race. The determination of what features to use for examining bias and/or data imbalance may be made based on multiple parameters that may be stored in a database accessible to the bias detection tool. In an implementation, a ML model may be used for identifying relevant feature(s).

It should be noted that features for which data imbalance detection is performed may not be actual fields in the dataset. In an example, a balanceable feature may be a feature that the ML model derives by itself. For example, the initial dataset may have patient locations and air mile distances to the local hospital. During training, the ML model may derive a feature such as transit time to the local hospital that is not explicit in the original dataset based on the patient locations and air mile distances to the local hospital. Such features may be presentable and balanceable as well, as typically a modeler can get numeric feature values for the ML model derived features for a given input record.

In one implementation, the labels feature may be also selected as a feature to examine bias for. That is because bias can easily be introduced in ML training via an imbalanced label. In general, in order for ML models to classify or predict binary or multi-class information, such as whether a face is male or female, or whether a given person is a good credit risk for an unsecured loan, the training data may include a label that specifies which class a given record falls into. This data may then be used to teach the ML model which category to apply to new input. In other words, the label data may teach the ML model which label to apply to new input. Thus, an imbalanced label may result in an inaccurate or biased ML model. For example, for an ML model designed to distinguish cats from dogs in pictures, having two few datapoints that are labeled as cats in the training dataset may result in the trained model not being able to accurately classify cats. Thus, in addition to identifying common features that introduce bias in a dataset, the label may also be identified as a feature to be examined. This may be done automatically by the system.

Once the features for which data imbalance should be examined are identified, method 600 may proceed to examine the dataset(s) to identify bias, at 625. This may include performing statistical analysis of the data to categorize and identify a distribution across multiple categories. For example, for a dataset for which the feature gender is being examined, method 600 may determine the number of datapoints corresponding to the each of the categories available for gender (e.g., male, female, and other). The number of each category may then be compared to the total number of datapoints to calculate a percentage of the datapoints representing each category. Other features may require more complex analysis. For example, to determine distribution of skin tone in a dataset comprised of facial images, the images may first need to be processed to extract the skin tone information from them. Then based on the extracted information, the number of categories available for skin tone may be identified before the number of datapoints in each category can be calculated. In one implementation, a machine leaning model may be used in performing statistical analysis of the dataset to categorize and identify bias. In one implementation, the identified distribution is examined to determine whether the feature correspond with the desired distribution within the certain threshold.

Once the dataset is examined and the distribution of the one or more identified features is determined, method 600 may proceed to determine if bias is detected, at 630. If no bias is detected or detected bias is within the desired threshold from the desired distribution, method 600 may automatically proceed to train the model, at 655. In an example, once the model is trained based on the new subset, outcome of the model may be examined for output bias, at 660 and method 600 may return to step 630 to determine if bias is detect in the output data, and the process may be iterated, if needed.

When bias is detected, at 630, method 600 may proceed to correct the bias. In one implementation, once biased is detected, it may be reported to a user. In other words, this may be another place in the process where the user may receive information from the process and provide input to determine how it should move forward. For example, based on the reported bias, the user may select a feature based on which bias correction will be performed, at 635. In addition to identifying the feature(s), the user may also specify a desired threshold of similarity to a desired distribution for the corrected dataset. The desired threshold may be the same or it may be different for each identified feature.

In an alternative implementation, the features may be automatically and/or intelligently identified by the system. For example, the system may examine the results of the bias detection operation and determine if any imbalanced distributions indicative of bias in the dataset were detected. In an example, the system may determine if commonly biased features such as gender, race, sexual orientation, and age exhibit an imbalance distribution. In one implementation, an ML training algorithm may automatically include a stage for correction of bias once bias is detected in a dataset associated with training the ML model and the stage may be performed fully automatically for example by using a ML mode.

Once the features for which bias should be corrected are identified, method 600 may proceed to identify a desired distribution for the selected feature(s), at 640. In one implementation, the desired distribution may be selected by the user. For example, the bias detection and/or correction application may provide a user interface for choosing the desired distribution for each of the categories applicable to the selected feature(s). This may be presented as a set of slidable controls for choosing a percentage for each of the categories of the selected feature(s), as discussed above. Alternatively, the user may enter (e.g., by typing the desired distribution, or by choosing from a dropdown menu, and the like) the desired feature(s) in a user interface element. In an alternative implementation, the desired distributions may be selected automatically by the system. For example, the system may identify an imbalance in a feature indicative of bias, may determine or receive from a user an ideal distribution for the feature, and may calculate how the ideal distribution can be achieved. Machine leaning algorithms may be used to determine the desired distributions.

Once the desired distributions for the feature(s) are identified, method 600 may proceed to select a subset of data that satisfies the desired distributions for the identified feature(s) from the original dataset, at 645. This may be done by calculating the number of datapoints associated with the desired feature(s) that need to be chosen from the original dataset and choosing a subset of data from the original dataset that satisfies this requirement. Method 600 may then proceed to select a subset of data that satisfies the desired distributions for the identified feature(s) from each of the training and validation datasets. This may be done to ensure that training and validation datasets do not introduce bias in model training. In one implementation, method 600 may utilize a trained ML component to select the subset(s) in a manner that converges more quickly than involving a human.

Once the new subset(s) are selected, method 600 may proceed to examine the new subsets for data imbalance, at 650. This step may be requested by the user or be performed automatically. The examination may be performed to ensure that the new subsets achieved their desired purpose and/or they do not introduce new bias. To perform this step, statistical analysis of the data in the new subsets may be performed to categorize and identify a distribution across multiple categories of one or more features. In one implementation, commonly biased features may be examined. Additionally, features based on which data imbalance correction was performed may be examined to ensure data imbalance correction has been achieved. Once data imbalance detection is performed, method 600 may proceed to determine if data imbalance is detected in the new subset(s), at 630, and the process may be iterated, as needed. The process may be repeated automatically and as many times as needed to create the least biased model possible given the data. As a result, the ML model may be trained to find the most rapid convergence.

Thus, methods and systems for performing semi or fully automatic data imbalance detection and correction in training a ML model are disclosed. By providing semi or fully data imbalance detection and correction, the methods and systems may quickly and efficiently identify, eliminate or reduce bias. This can improve efficiency of the training process, while ensuring they comply with ethical, fairness, regulatory and policy standards.

Figure 7:
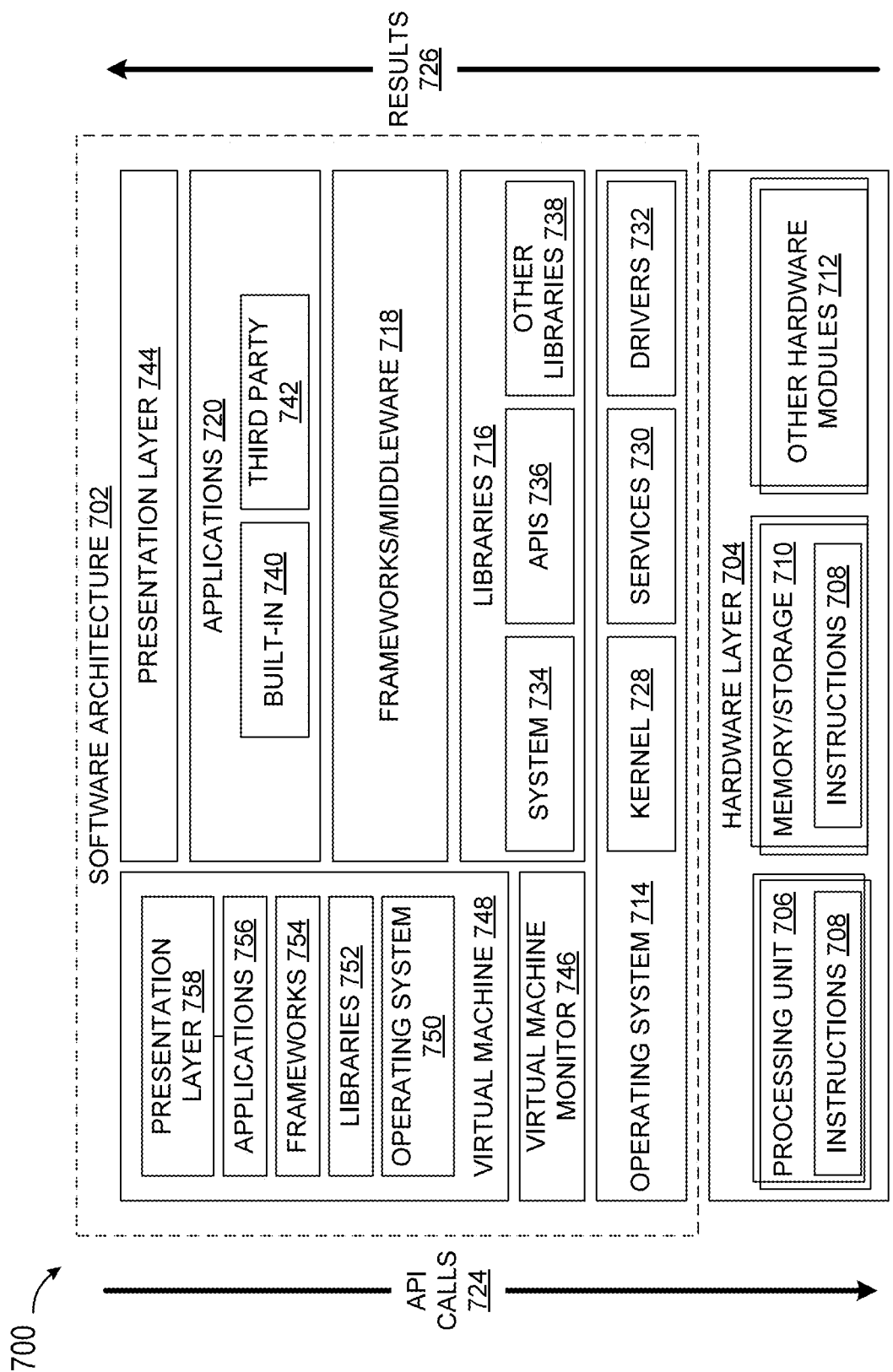
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 708 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 724. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various GUI functions, high-level resource management, or high-level location services. The frameworks 718 may provide a broad spectrum of other APIs for applications 720 and/or other software modules.

The applications 720 include built-in applications 720 and/or third-party applications 722. Examples of built-in applications 720 may include, but are not limited to, a contacts application, a browser application, a location application, a media application, a messaging application, and/or a game application. Third-party applications 722 may include any applications developed by an entity other than the vendor of the particular system. The applications 720 may use functions available via OS 714, libraries 716, frameworks 718, and presentation layer 724 to create user interfaces to interact with users.

Some software architectures use virtual machines, as illustrated by a virtual machine 728. The virtual machine 728 provides an execution environment where applications/modules can execute as if they were executing on a hardware machine (such as the machine 800 of FIG. 8, for example). The virtual machine 728 may be hosted by a host OS (for example, OS 714) or hypervisor, and may have a virtual machine monitor 726 which manages operation of the virtual machine 728 and interoperation with the host operating system. A software architecture, which may be different from software architecture 702 outside of the virtual machine, executes within the virtual machine 728 such as an OS 750, libraries 752, frameworks 754, applications 756, and/or a presentation layer 758.

Figure 8:
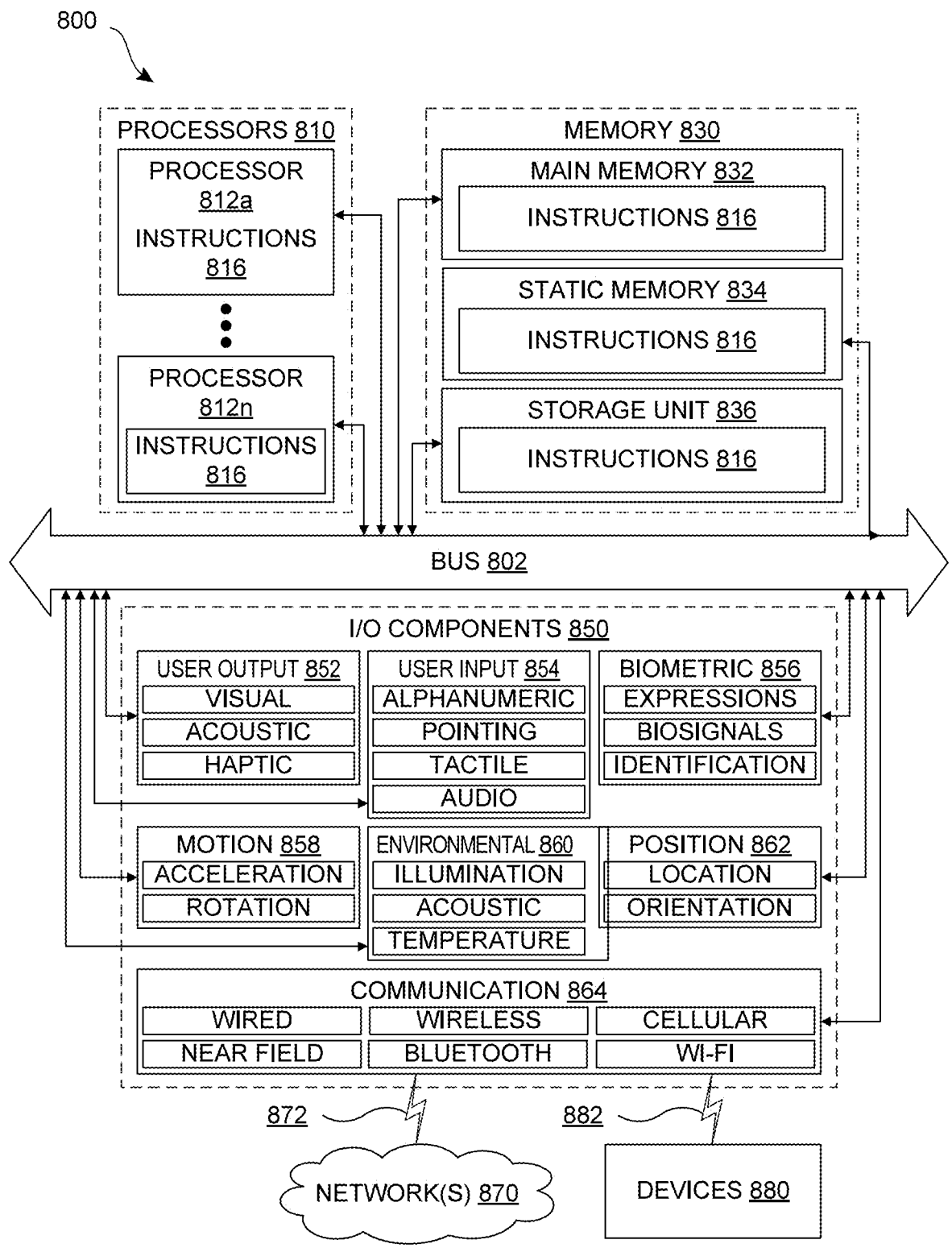
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" include a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 916 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor cause the data processing system to perform functions of:
receiving a request to train a machine-learning (ML) model;
receiving access to a dataset for use in training the ML model;
identifying a feature of the dataset for which data imbalance detection is to be performed;
examining the dataset to determine a distribution of the feature across the dataset;
determining if the distribution of the feature across the dataset indicates a data imbalance;
upon determining that the distribution of the feature across the dataset indicates the data imbalance, identifying a desired distribution for the identified feature;
selecting a subset of the dataset that corresponds with the selected feature and the desired distribution; and
using the subset to train the ML model.

2. The data processing system of claim 1, wherein the functions are performed without user input.

3. The data processing system of claim 1, wherein the functions are performed with some user input.

4. The data processing system of claim 1, wherein examining the dataset to determine a distribution of the feature includes performing a statistical analysis on the dataset to determine the distribution of the feature across one or more categories available for the feature.

5. The data processing system of claim 1, wherein the dataset includes at least one of an input training dataset, a training subset of the input training dataset, a validation subset of the input training dataset, and an outcome dataset.

6. The data processing system of claim 1, wherein the feature includes a label feature of the dataset.

7. The data processing system of claim 1, wherein the executable instructions when executed by the processor further cause the data processing system to perform functions of:
examining the subset to determine if a subset data imbalance exists;
upon determining the subset data imbalance, performing a data imbalance correction on the subset to create a corrected subset; and
repeating a process of examining the corrected subset and performing data imbalance on the corrected subset until a desired subset is created.

8. A method for performing bias detection and correction in training a ML model, the method comprising:
receiving a request to train the ML model;
receiving access to a dataset for use in training the ML model;
identifying a feature of the dataset for which data imbalance detection is to be performed;
examining the dataset to determine a distribution of the feature across the dataset;
determining if the distribution of the feature across the dataset indicates a data imbalance;
upon determining that the distribution of the feature across the dataset indicates the data imbalance, identifying a desired distribution for the identified feature;

selecting a subset of the dataset that corresponds with the selected feature and the desired distribution; and using the subset to train the ML model.

9. The method of claim 8, wherein steps of the method are performed without user input.

10. The method of claim 8, wherein steps of the method are performed with some user input.

11. The method of claim 8, wherein examining the dataset to determine a distribution of the feature includes performing a statistical analysis on the dataset to determine the distribution of the feature across one or more categories available for the feature.

12. The method of claim 8, wherein the dataset includes at least one of an input training dataset, a training subset of the input training dataset, a validation subset of the input training dataset, and an outcome dataset.

13. The method of claim 8, wherein the feature includes a label feature of the dataset.

14. The method of claim 8, further comprising:

examining the subset to determine if a subset data imbalance exists;

upon determining the subset data imbalance, performing a data imbalance correction on the subset to create a corrected subset; and repeating a process of examining the corrected subset and performing data imbalance on the corrected subset until a desired subset is created.

15. A non-transitory computer readable medium on which are stored instructions that, when executed cause a programmable device to:

receive a request to train a machine-learning (ML) model;

receive access to a dataset for use in training the ML model;

identify a feature of the dataset for which data imbalance detection is to be performed;

examine the dataset to determine a distribution of the feature across the dataset;

determine if the distribution of the feature across the dataset indicates a data imbalance;

upon determining that the distribution of the feature across the dataset indicates the data imbalance, identify a desired distribution for the identified feature;

select a subset of the dataset that corresponds with the selected feature and the desired distribution; and use the subset to train the ML model.

16. The non-transitory computer readable medium of claim 15, wherein the instructions when executed cause the programmable device to perform steps without user input.

17. The non-transitory computer readable medium of claim 15, wherein the instructions when executed cause the programmable device to perform steps with some user input.

18. The non-transitory computer readable medium of claim 15, wherein examining the dataset to determine a distribution of the feature includes performing a statistical analysis on the dataset to determine the distribution of the feature across one or more categories available for the feature.

19. The non-transitory computer readable medium of claim 15, wherein the feature includes a label feature of the dataset.

20. The non-transitory computer readable medium of claim 15, wherein the instructions, when executed cause the programmable device to:

examine the subset to determine if the data imbalance exists;

upon determining the subset data imbalance, perform a data imbalance correction on the subset to create a corrected subset; and repeat a process of examining the corrected subset and performing data imbalance on the corrected subset until a desired subset is created.

\* \* \* \* \*